(12) United States Patent
Pope

(10) Patent No.: US 9,986,732 B1
(45) Date of Patent: Jun. 5, 2018

(54) DUAL SEAT ASSEMBLY FOR A HUNTING TREE STAND

(71) Applicant: Richard Pope, Lexington, SC (US)

(72) Inventor: Richard Pope, Lexington, SC (US)

( * ) Notice: Subject to any disclaimer, the term of this patent is extended or adjusted under 35 U.S.C. 154(b) by 11 days.

(21) Appl. No.: 15/581,083

(22) Filed: Apr. 28, 2017

(51) Int. Cl.
*A01M 31/02* (2006.01)
*A47C 9/10* (2006.01)

(52) U.S. Cl.
CPC .............. *A01M 31/02* (2013.01); *A47C 9/10* (2013.01)

(58) Field of Classification Search
CPC ............. A01M 31/02; A47C 9/10; A47C 3/19
See application file for complete search history.

(56) References Cited

U.S. PATENT DOCUMENTS

| 4,458,782 | A | | 7/1984 | Meyer | |
|---|---|---|---|---|---|
| 4,723,630 | A | * | 2/1988 | Wolford | A01M 31/02 108/152 |
| 5,462,135 | A | * | 10/1995 | Ambler | A01M 31/02 182/187 |
| 6,102,158 | A | | 8/2000 | Winschel | |
| 6,866,120 | B1 | | 3/2005 | Butterworth | |
| 7,971,685 | B2 | * | 7/2011 | Simone | A01M 31/02 182/133 |
| 8,522,920 | B1 | | 9/2013 | Salyer et al. | |
| 8,556,036 | B1 | * | 10/2013 | Meredith | A01M 31/02 182/113 |
| 9,089,125 | B1 | * | 7/2015 | Fast | A01M 31/02 |
| 9,516,874 | B2 | | 12/2016 | Richey et al. | |
| 9,648,958 | B2 | * | 5/2017 | Pectol | A47C 9/10 |
| 2007/0261919 | A1 | | 11/2007 | Roe | |
| 2015/0181860 | A1 | * | 7/2015 | Johnson | A01M 31/02 182/187 |
| 2016/0058192 | A1 | * | 3/2016 | Drew | A47C 3/18 297/4 |
| 2017/0150710 | A1 | * | 6/2017 | Damske | A01M 31/02 |

* cited by examiner

*Primary Examiner* — Katherine W Mitchell
*Assistant Examiner* — Candace L Bradford
(74) *Attorney, Agent, or Firm* — Thomas L. Moses; Southeast IP Group, LLC.

(57) ABSTRACT

A collapsible hunting tree stand includes a dual seat arrangement, so that the seat may be positioned in a normal seating position, or where the seat may be in an elevated seating/leaning position.

7 Claims, 12 Drawing Sheets

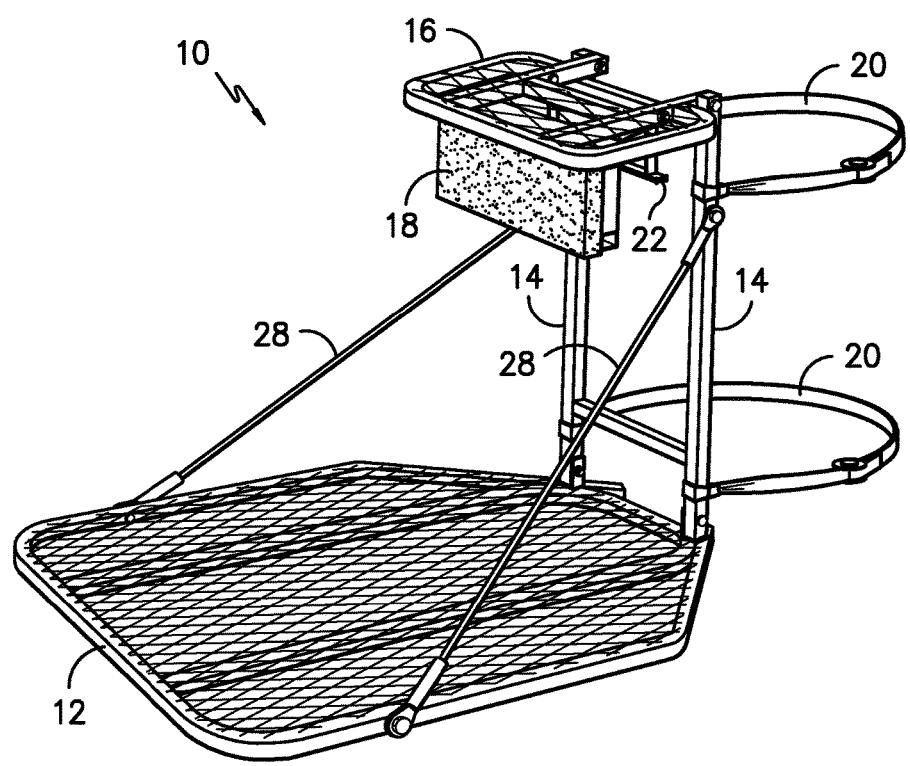
FIG. -1-

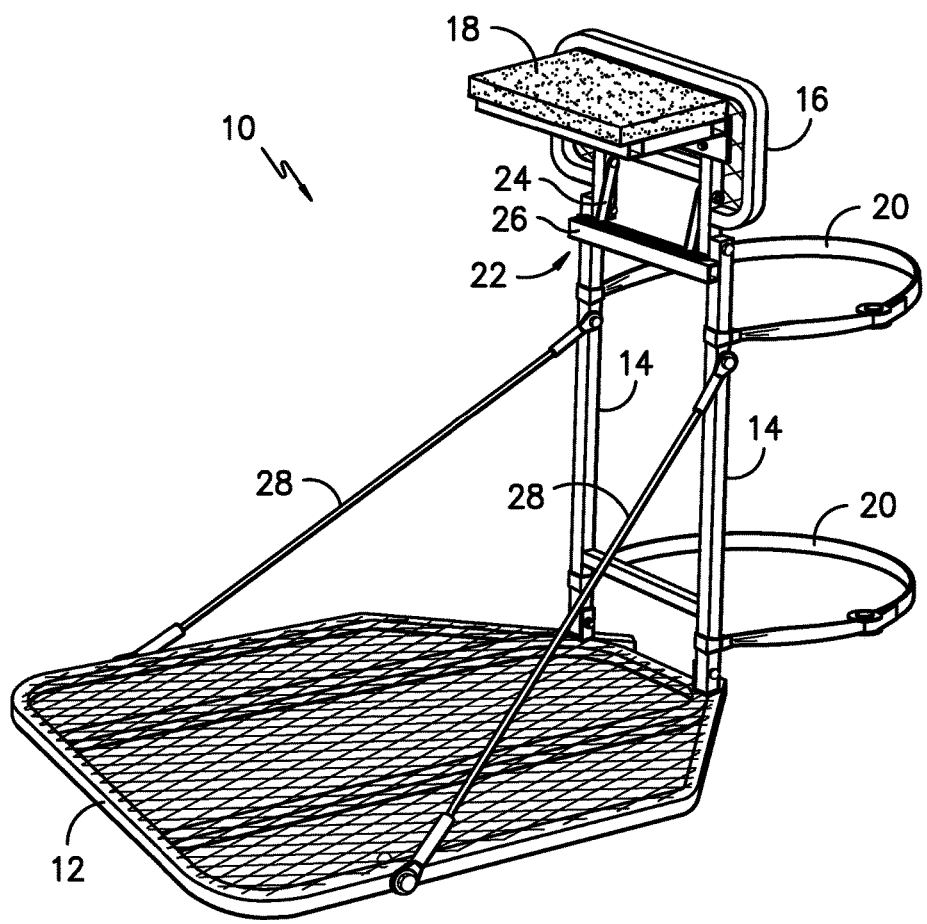
FIG. -2-

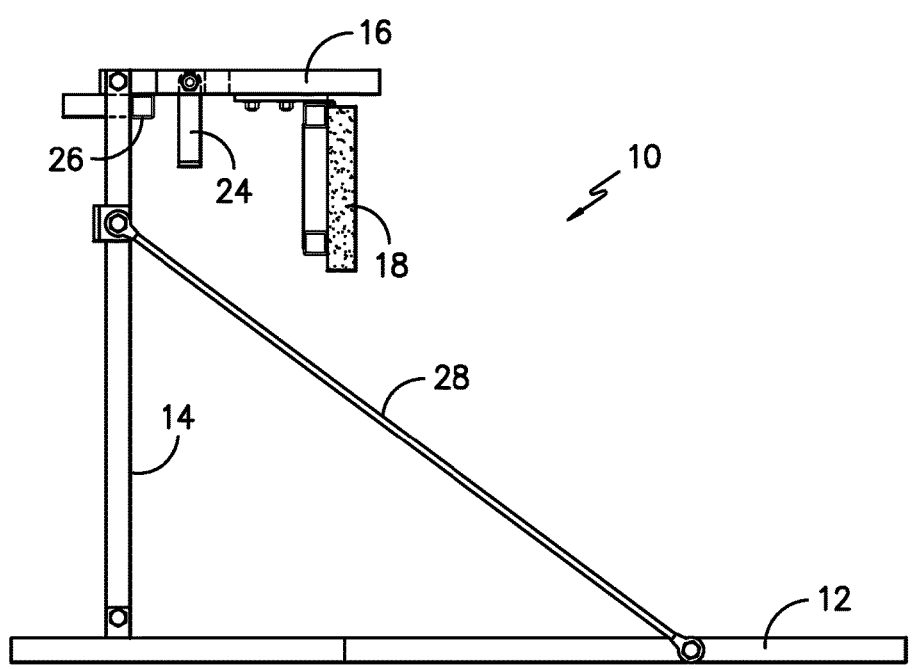
FIG. -3-

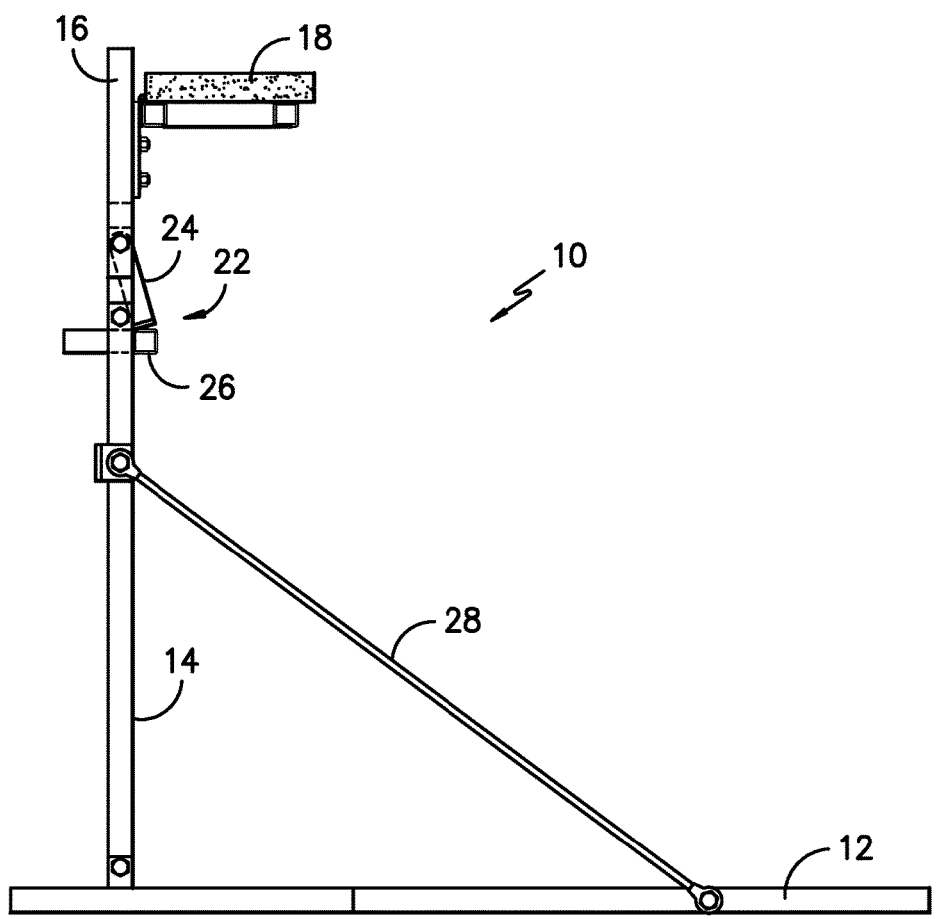
FIG. -4-

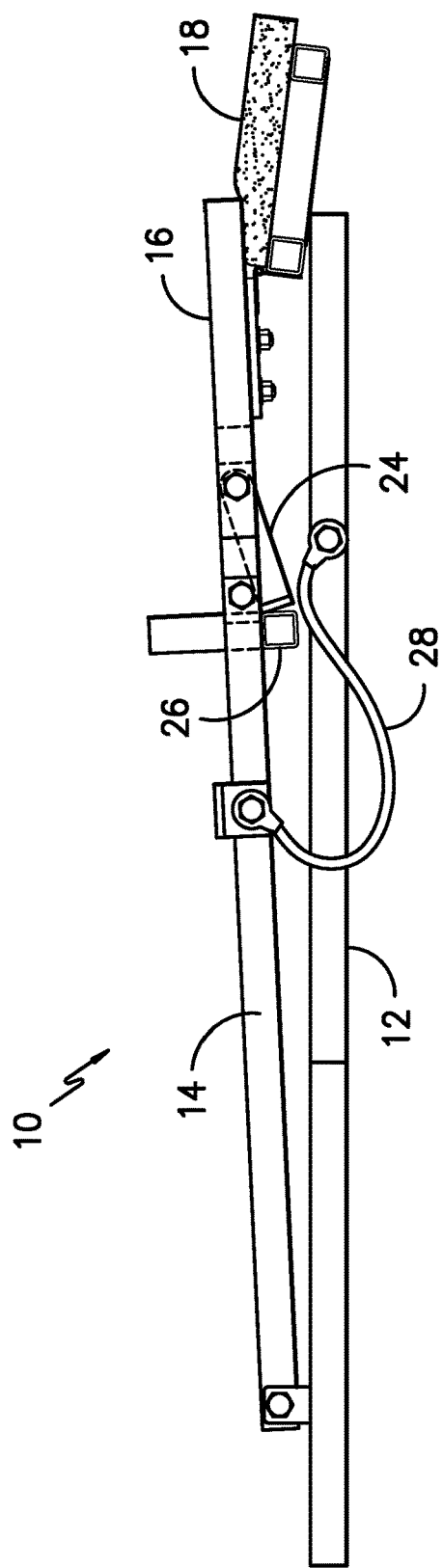
FIG. -5-

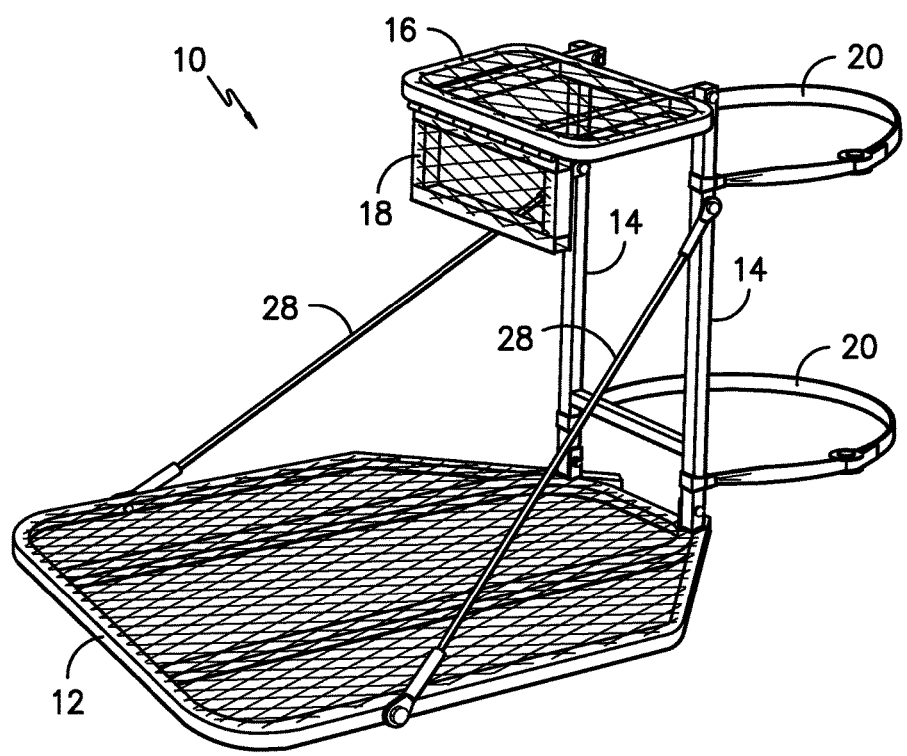
FIG. -6-

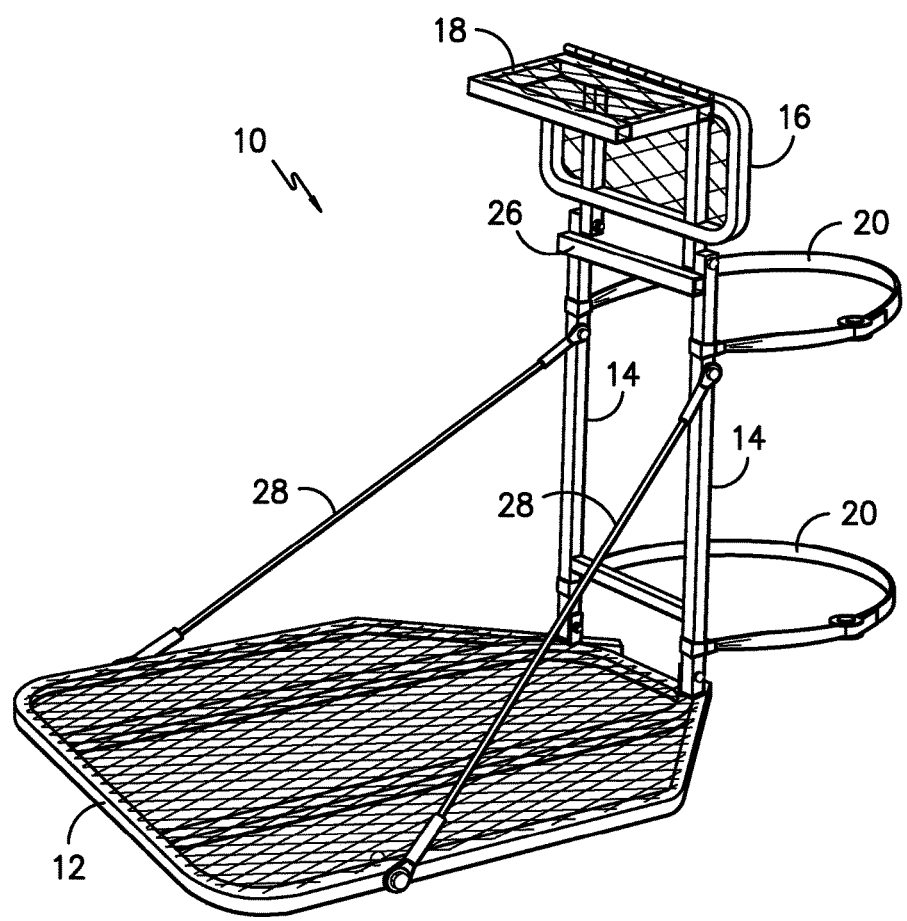
FIG. -7-

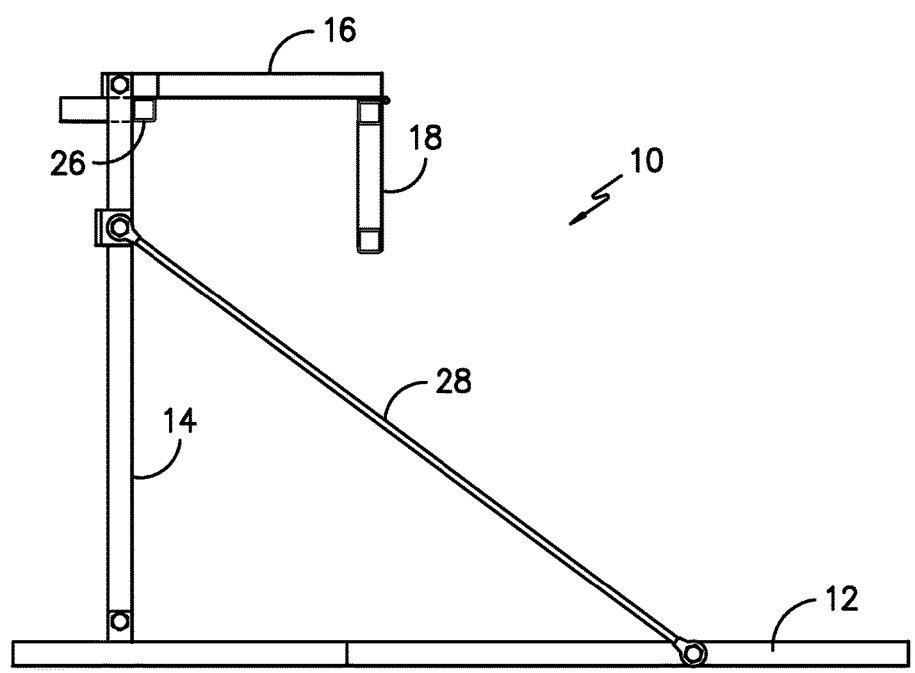
FIG. -8-

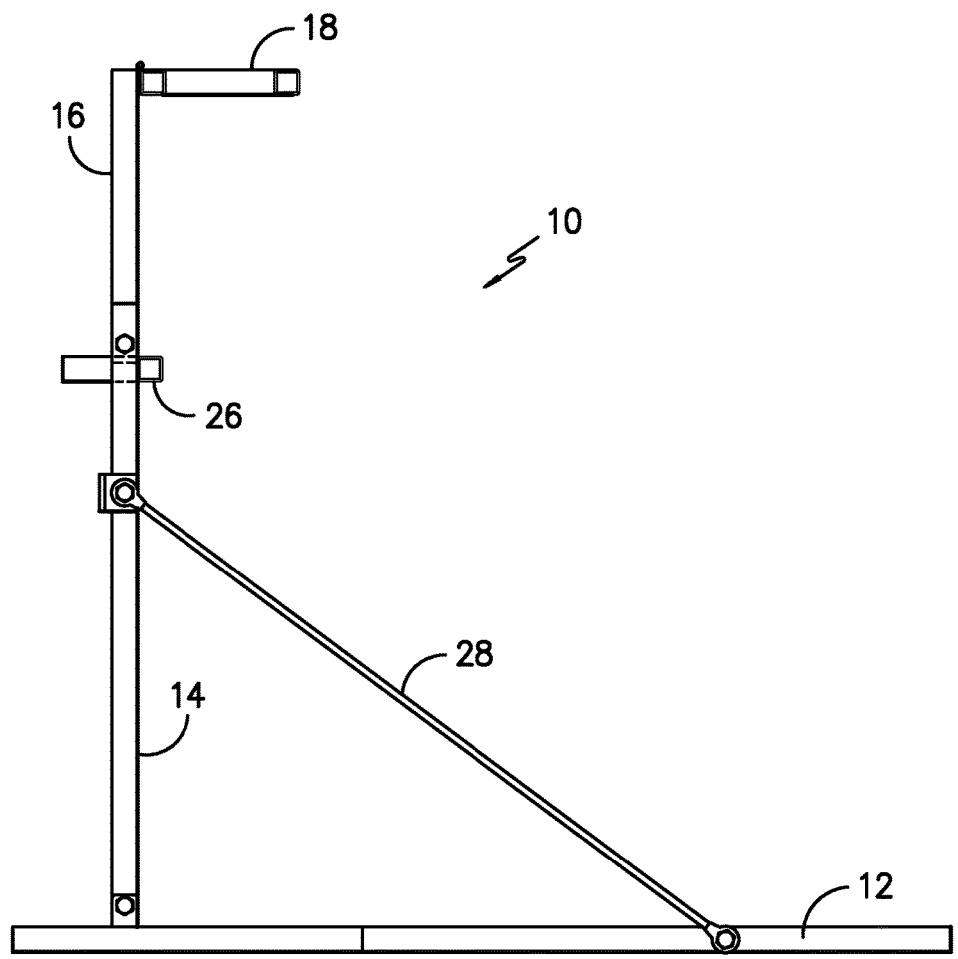
FIG. -9-

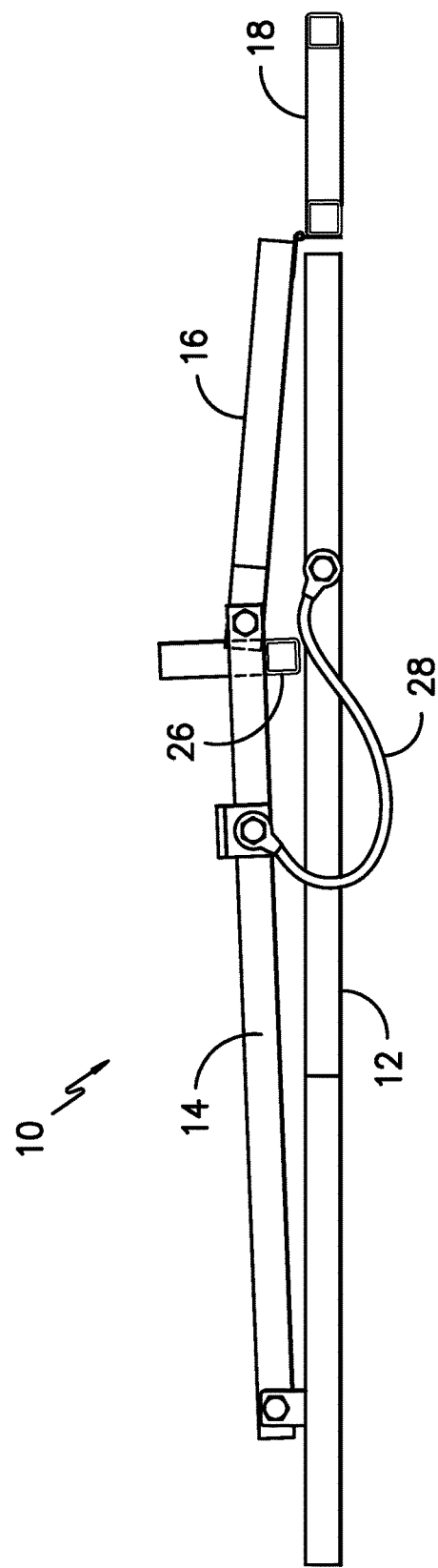
FIG. -10-

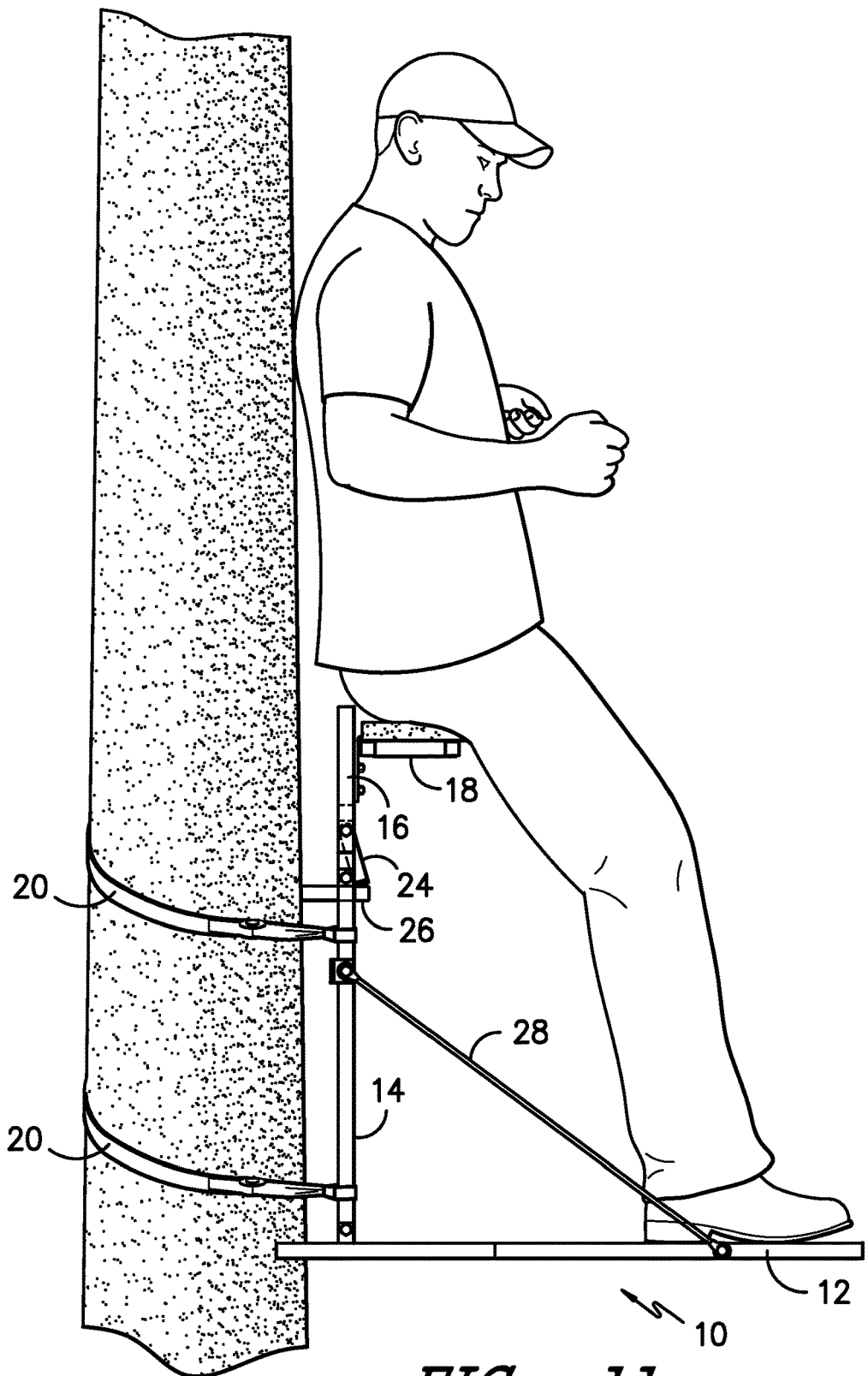
FIG. -11-

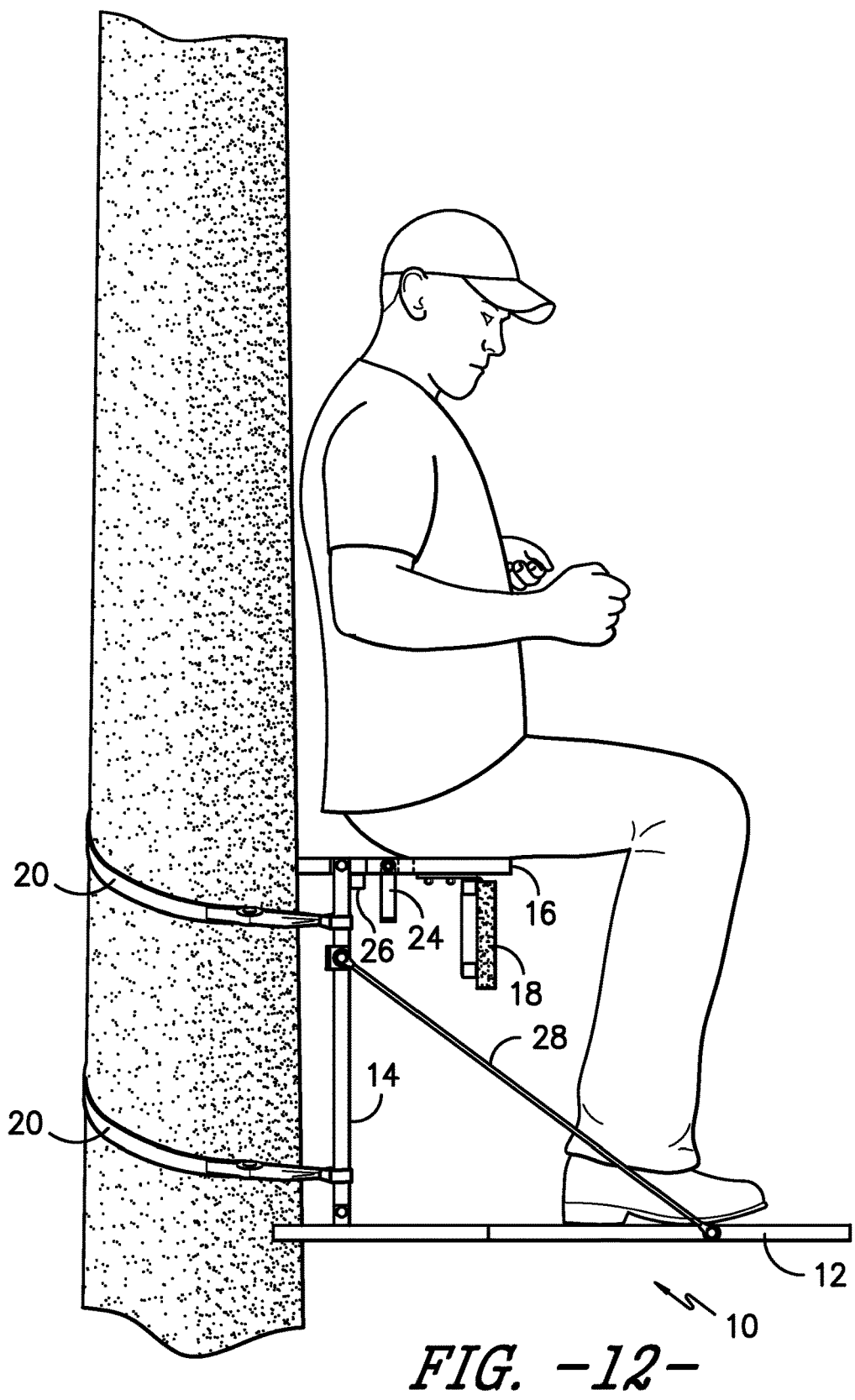
FIG. -12-

DUAL SEAT ASSEMBLY FOR A HUNTING TREE STAND

BACKGROUND OF THE INVENTION

The present invention relates generally to tree stands used for hunting game. More specifically, the present invention includes a tree stand that may be secured to a tree, and which includes a standing platform and a folding dual seat assembly, so that a hunter may choose to be in a standing position, a standard sitting position, or an elevated sitting position.

Over the years, many different types of hunting tree stands and deer stands have been developed for hunting game. Some of the more popular tree stands are collapsible, so that they may be transported in a vehicle to a designated hunting location in a collapsed state, and then may be affixed or secured to a tree in an open, operational position. These tree stands typically include a standing platform and a seat, so that a hunter may stand or sit while hunting.

The following references serve as examples of various types of tree stands used for hunting, and are hereby incorporated herein by reference.

U.S. Pat. No. 4,458,782

A seat assembly particularly adapted for support upon the inclined side frame members of the Baker tree stand (U.S. Pat. No. 3,460,649). The seat assembly includes an elongated seat member transversely spanning the side frame members and being provided with depending legs resting upon the side frame members, and a pair of hanger straps affixed to the opposite ends of the seat member and projecting upward and rearward, and pin members selectively and detachably connecting the upper ends of the hangers members, behind the seat member, to a set of longitudinally spaced bolt holes in the side frame members.

U.S. Publication No. 20070261919A1

An adjustable tree stand for mounting and supporting a hunter in a tree a distance above the ground. The tree stand system includes a tree-engaging frame with a pair of spaced apart, normally upright members each having opposed, upper and lower ends and a cross member located between the upright members. In addition, the system includes a seat assembly, a platform, a pair of spaced cable members and a strap connected to the upright members of the frame. The seat assembly is mounted on the frame and has a seat for a hunter to sit on. The assembly is generally movable between an operative and a folded position, providing a supporting structure with a pair of supper, spaced components that project generally horizontally rearwardly for engagement with the tree when the seat assembly is in the operative position. The seat assembly includes an elongated, longitudinally extensible and retractable strut interconnecting the cross member and the seat for supporting the seat in a generally horizontal orientation when the strut is extended to a desired position. The platform is pivotally mounted to the lower ends of the upright members and the cable pair interconnects the platform and the frame allowing for movement between a folded, stored position and a operational position where the cables tensionally hold the platform. The platform also has a pair of lower, spaced components that project generally horizontally rearwardly for engagement with the tree when the platform is in the operational position. The strap connects the upright members of the frame and is adapted to embrace the tree trunk, holding the upper and lower spaced components against the tree, whereby the components and strap secure the tree stand to the tree during use.

U.S. Pat. No. 9,516,874

A hunting tree stand is disclosed. The hunting tree stand includes a backbone configured to be secured to a tree, an inner radial support beam having a generally are shape, and a plurality of cantilevered supports extending outwards from the inner radial support beam. In addition, the hunting tree stand includes a pair of adjustment plates disposed on a respective proximate end of the plurality of cantilevered supports and configured to be secured to opposing sides of a lower end of the backbone. A plurality of adjustment apertures are disposed in a curvilinear pattern on the pair of adjustment plates, where the plurality of adjustment apertures are positioned so that an angle of a decking to the backbone can be adjusted relative to the backbone by rotating the decking downwards or upwards and inserting an adjustment pin through a desired adjustment aperture and the lower end of the backbone.

U.S. Pat. No. 8,522,920

A tree stand that contains a y-axis frame adjustable along the y-axis, x-axis frame adjustable along the x-axis, and z-axis frame adjustable along the z-axis. In use, at least one securing strap secures the y-axis frame to a tree. To adjust the y-axis frame along the y-axis, the securing strap is loosened and the y-axis frame can be repositioned almost anywhere along the tree that will support the tree stand. To adjust the x-axis frame along the x-axis, the x-axis frame can be rotated around a rotational support means on the y-axis. To adjust the z-axis frame along the z-axis, a z-axis frame support is attached to the x-axis and connects to one of at least two z-axis adjustment means on the x-axis.

U.S. Pat. No. 6,866,120

A portable tree stand for use with non-vertical trees provides standing and seating platforms that may remain parallel and may be adjustable. Adjustments include a slidable seat platform and a slidable standing platform that may be extended to allow adequate seating and standing space to compensate for tree trunks that diverge from the vertical. Additionally, the distance, or height, between the standing platform and the seating platform maybe varied. A threaded chain tensioner tightens a chain around the tree helping hold the stand to the tree, and optionally a tree screw secures attachment to the tree trunk. An adjustable seat support post establishes a parallelogram relationship between the seat platform and the standing platform such that an angular relationship, which may be parallel or non-parallel, may be maintained between the seat platform and the standing platform.

U.S. Pat. No. 6,102,158

A portable tree stand capable of being erected and levelled within a leaning tree is provided. The stand comprises a tree engaging support member which is pivotally connected to the frame of the stand. This arrangement allows the seat and platform of the stand to be adjusted to a level position when erected in a leaning tree where the direction of the lean of the tree is sideways with respect to the erected stand. A back rest is also provided to give support to the hunter.

Although some of these prior inventions include adjustable seats, the adjustments are difficult to make, and further, are made more difficult in the presence of game that may be nearby. There are times when a hunter, and particularly a bow hunter, needs to quietly get himself into a standing position, or at least close to a standing position, when a deer or other game is nearby, in order to be ready to take a shot. Furthermore, after the hunter is in a standing position, particularly when he has sighted game that is not yet close enough to shoot, he may have to remain in the standing position for some time before the game ventures close enough to take a shot. It would be desirable, therefore, to provide a deer stand with a seating mechanism that would allow a hunter to sit or lean in an elevated position, so that he is in a better position to take the shot when the opportunity presents itself. Additionally, it would be desirable for the hunter to be able to adjust the seat from a conventional sitting position to an elevated sitting/leaning position quickly and quietly in the presence of game, without making noise or fumbling with adjustment mechanisms. None of the prior art discloses a tree stand that includes a dual position seating arrangement that may be operated easily and quietly while a hunter is in the stand.

BRIEF SUMMARY OF THE INVENTION

In accordance with one aspect of the invention, a tree stand includes a standing platform, a support structure pivotally attached to the standing platform, and a primary seat member pivotally attached to the support structure. On a front portion of the primary seat member, a secondary seat member is attached. The secondary seat member is preferably pivotally attached to the primary seat member, so that it may extend in the same plane with the primary seat, or may be disposed at a right angle with respect to the primary seat. When the tree stand is secured to a tree, the primary seat member may be disposed at a generally right angle with respect to the support structure (and generally parallel to the ground and the standing structure), so that the primary seat allows the hunter to sit in a normal sitting position. Alternatively, the primary seat may be disposed in a vertical position, above and in line with the support structure, while the secondary seat member is in a generally horizontal position (generally parallel with the ground and standing structure), to provide an elevated seating or leaning position for the hunter. It is also contemplated that the secondary seat may be fixed at about a 90 degree angle with respect to the primary seat, so that the secondary seat does not pivot.

In a preferred embodiment, the tree stand is collapsible, so that the support structure may pivot into a position that is generally parallel with the standing platform, and the seat members may also fold together in such a way that they are generally in parallel relation to the standing platform. A user may fold the tree stand into the collapsed state for transport and storage of the tree stand, and then may unfold it for use in a tree.

The tree stand also includes means of attachment to a tree, which may comprise one or more adjustable and/or cinch straps, chains, or the like. Further, the primary seat member and secondary seat member may include temporary securing means, in order to maintain each seat in a desired position temporarily.

In another embodiment, a hinged secondary seat may simply be added to the primary seat of a pre-existing tree stand, so that when the primary seat is flipped up to a vertical position, the secondary seat provides an elevated seating position.

BRIEF DESCRIPTION OF THE DRAWINGS

These and other features, aspects, and advantages of the present invention will become better understood with regard to the following description, appended claims, and accompanying drawings where:

FIG. 1 is a perspective view of one embodiment of a dual seat assembly for a hunting tree stand, showing a secondary seat that is fixed in position at a generally right angle with respect to the primary seat, wherein the primary seat is disposed in a seating position;

FIG. 2 is a perspective view of one embodiment of a dual seat assembly for a hunting tree stand, showing the primary seat disposed in a vertical position and the secondary seat in a seating position, and further showing temporary securement means for retaining the primary seat in the vertical position;

FIG. 3 is a side view of one embodiment of a dual seat assembly for a hunting tree stand, showing a secondary seat that is fixed in position at a generally right angle with respect to the primary seat, wherein the primary seat is disposed in a seating position;

FIG. 4 is a side view of one embodiment of a dual seat assembly for a hunting tree stand, showing the primary seat disposed in a vertical position and the secondary seat in a seating position, and further showing temporary securement means for retaining the primary seat in the vertical position;

FIG. 5 is a side view of one embodiment of a dual seat assembly for a hunting tree stand, showing the hunting tree stand in a collapsed position;

FIG. 6 is a perspective view of one embodiment of a dual seat assembly for a hunting tree stand, showing a secondary seat that is pivotally attached to the primary seat, wherein the primary seat is disposed in a seating position;

FIG. 7 is a perspective view of one embodiment of a dual seat assembly for a hunting tree stand, showing a secondary seat that is pivotally attached to the primary seat, wherein the primary seat is disposed in a vertical position and the secondary seat is in a seating position;

FIG. 8 is a side view of one embodiment of a dual seat assembly for a hunting tree stand, showing a secondary seat that is pivotally attached to the primary seat, wherein the primary seat is disposed in a seating position;

FIG. 9 is a side view of one embodiment of a dual seat assembly for a hunting tree stand, showing a secondary seat that is pivotally attached to the primary seat, wherein the primary seat is disposed in a vertical position, and the secondary seat is in a seating position;

FIG. 10 is a side view of one embodiment of a dual seat assembly for a hunting tree stand, showing the hunting tree stand in a collapsed position;

FIG. 11 is a side view of one embodiment of a dual seat assembly for a hunting tree stand, showing the primary seat disposed in a vertical position and the secondary seat in a seating position, and further showing temporary securement means for retaining the primary seat in the vertical position; and FIG. 12 is a side view of one embodiment of a dual seat assembly for a hunting tree stand, showing a secondary seat that is fixed in position at a generally right angle with respect to the primary seat, wherein the primary seat is disposed in a seating position.

DETAILED DESCRIPTION OF THE INVENTION

The present invention includes, in a first embodiment, a collapsible hunting tree stand 10 that includes a dual seat arrangement, so that the seat may be positioned in a normal seating position, or where the seat may be in an elevated seating/leaning position. The tree stand 10 includes, in a preferred embodiment, a standing platform 12, a support structure 14 pivotally engaged with the standing platform, and a primary seat 16 pivotally engaged with the support structure. A secondary seat 18 is attached to the front portion of the primary seat 16, and it may be pivotally engaged with the primary seat 16 so that the secondary seat 18 extends outwardly in the same plane as the primary seat 16 and fold down into a right angle with respect to the primary seat 16 as shown in FIGS. 5-10, or the secondary seat 18 may simply be fixed at a generally right angle with respect to the primary seat 16, as shown in FIGS. 1-4 and 11-12. The tree stand 10 may be affixed or secured to a tree using any suitable means, including cinch straps 20, fixed straps, chains, or any other suitable method. Various methods for securing tree stands to trees are discussed in the references cited herein, and are hereby incorporated by reference. A pair of flexible support cables 28 may be attached between the support structure 14 and the standing platform 12, in order to maintain the support structure 14 and the standing platform 12 at a generally right angle during use.

The tree stand 10 is preferably collapsible, as shown in FIGS. 5 and 10, although it is contemplated that most of the components may also be fixed with respect to each other. In the collapsible embodiment, the support structure folds 14 down so that it is parallel with the standing platform 12. The primary seat 16 may also fold into a position that is generally parallel with the standing platform 12, and the secondary seat 18 may also fold so that it is parallel with the standing platform 12, or may simply extend in the same plane as the primary seat 16. Advantageously, the tree stand 10 may be transported and stored in the collapsed position, and may be moved into the operational position for use in a tree. It is contemplated that any pivoting mechanism described herein may have securing means to temporarily lock the components in place, either in the operational position, or in the collapsed position, and such securing means are well-known in the art.

In use, when the tree stand 10 is secured to a tree, the standing platform 12 is generally parallel to the ground, and the support structure 14 is oriented in a generally vertical position. The primary seat 16 may be placed in a generally horizontal position, to provide a conventional seating position for a hunter, as shown in FIG. 12. Alternatively, the primary seat 16 may be flipped upwardly into a generally vertical position, and the secondary seat 18 may be placed into a horizontal position, to provide an elevated seating position for a hunter, as shown in FIG. 11. The hunter may either sit on the secondary seat 18 in this position, so that most of his weight is supported by the secondary seat 18, or the hunter may simply lean on the secondary seat 18, thereby splitting his weight between his legs/feet on the standing platform 12 and his buttocks on the secondary seat 18.

If a hunter is seated on the primary seat 16, and then sees a deer or other game in the distance, he can flip the primary seat 16 up and then sit or lean on the secondary seat 18, so that he is in a better position to take a shot at the game when the game comes close enough for the hunter to take a shot.

In one embodiment, a securing mechanism is used to keep the primary seat in the vertical position when the seat is flipped upwardly, as shown in FIGS. 2-5. The securing mechanism 22 may take many forms, but in one embodiment, includes a pivoting brace 24. The pivoting brace 24 is attached to the primary seat 16, and when the primary seat 16 is in the vertical position, the pivoting brace 24 may be positioned to engage against a fixed cross-brace member 26 of the support structure 14. When the pivoting brace 24 is engaged against the fixed cross-brace member 26, the primary seat 16 is temporarily locked into the vertical position, so that the hunter may use the secondary seat 18 without having the primary seat 16 inadvertently fold back down. In order to fold the primary seat 16 back down from the vertical to the horizontal position, the hunter simply rotates the pivoting brace 24 outwardly and away from the cross-brace member 26, allowing the primary seat 16 to pivot back down to the horizontal position. It is contemplated that other securing means may be used to keep the primary seat in a vertical position, and such securing means are well-known in the art.

In another embodiment, a hinged secondary seat 18 may simply be added to the primary seat 16 of a pre-existing tree stand, so that when the primary seat 16 is flipped up to a vertical position, the secondary seat 18 provides an elevated seating position. In this way, the secondary seat 18 may be added to any tree stand that includes a pivoting primary seat 16. It should be noted that in this embodiment, the secondary seat 18 may be attached to the primary seat 16 so that it is either fixed at a right angle with respect to the primary seat 16, or may be pivotally attached to the primary seat 16 with a hinge mechanism.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What I claim is:

1. A tree stand for hunting and observing game, said tree stand comprising:
    a standing surface;
    a support structure having an upper end and a lower end, said support structure attached to said standing surface on said lower end;
    a primary seat having a rear portion and a front portion, wherein said primary seat is pivotally attached to said upper end of said support structure at a rear portion thereof, so that said primary seat may be placed into a horizontal position or a vertical position; and
    a secondary seat attached to said front portion of said primary seat, wherein said secondary seat is oriented in a generally perpendicular orientation with respect to said primary seat, so that when said primary seat is in said horizontal position, said secondary seat is oriented in a downward direction from said front portion of said primary seat and said primary seat is configured to support a user seated at a first vertical location, and further, so that said secondary seat is in a generally horizontal position when said primary seat is in said vertical position and said secondary seat configured to support the user seated at a second vertical location higher than said first vertical location.

2. The tree stand set forth in claim 1, wherein said support structure is pivotally attached to said standing surface.

3. The tree stand set forth in claim 1, wherein said secondary seat is pivotally attached to said primary seat.

4. The tree stand set forth in claim 1, further including securing means for temporarily securing said primary seat into said vertical position.

5. The tree stand set forth in claim 4, wherein said securing means includes a pivoting brace that is pivotally attached to said primary seat member.

6. The tree stand set forth in claim 5, wherein said support structure includes a cross-brace member, and wherein said pivoting brace engages said cross-brace member to temporarily secure said primary seat member into said vertical position.

7. The tree stand set forth in claim 1, wherein said secondary seat is in a fixed position with respect to said primary seat.

* * * * *